(12) United States Patent
Yi

(10) Patent No.: US 10,728,784 B2
(45) Date of Patent: Jul. 28, 2020

(54) METHOD AND APPARATUS FOR DEFINING WIDEBAND CQI IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 16 days.

(21) Appl. No.: 15/765,691

(22) PCT Filed: Oct. 24, 2016

(86) PCT No.: PCT/KR2016/011967
§ 371 (c)(1),
(2) Date: Apr. 3, 2018

(87) PCT Pub. No.: WO2017/069593
PCT Pub. Date: Apr. 27, 2017

(65) Prior Publication Data
US 2019/0215710 A1    Jul. 11, 2019

Related U.S. Application Data

(60) Provisional application No. 62/245,286, filed on Oct. 23, 2015, provisional application No. 62/252,389, filed on Nov. 6, 2015.

(51) Int. Cl.
*H04W 24/10* (2009.01)
*H04L 5/00* (2006.01)
(Continued)

(52) U.S. Cl.
CPC ............ *H04W 24/10* (2013.01); *H04B 1/713* (2013.01); *H04B 17/336* (2015.01);
(Continued)

(58) Field of Classification Search
CPC ........ H04W 24/10; H04W 4/70; H04B 1/713; H04B 17/336
See application file for complete search history.

(56) References Cited

U.S. PATENT DOCUMENTS 7,970,001 B2 * 6/2011 Hoshino ............... H04L 1/0026
370/430
8,953,475 B2 * 2/2015 Li ......................... H04J 11/0023
370/252
(Continued)

OTHER PUBLICATIONS

"CQI calculation for Rel-13 MTC", 3GPP TSG RAN WG1 Meeting #82bis, R1-155951, MediaTek Inc., Malmö, Sweden, Oct. 5-9, 2015, total of 6 pages.
(Continued)

*Primary Examiner* — Ian N Moore
*Assistant Examiner* — Rushil Parimal Sampat
(74) *Attorney, Agent, or Firm* — Birch, Stewart, Kolasch & Birch, LLP

(57) ABSTRACT

A method and apparatus for measuring a channel quality indicator (CQI) in a wireless communication system is provided. A machine-type communication user equipment (MTC UE) receives at least one of a cell-specific reference signal (CRS) or a channel state information reference signal (CSI-RS) from a network, measures a wideband CQI over plurality of narrowbands based on the received CRS or CSI-RS by averaging narrowband CQIs of the plurality of narrowbands, and transmits the measured wideband CQI to the network.

8 Claims, 9 Drawing Sheets

(51) Int. Cl.
  *H04L 1/00* (2006.01)
  *H04B 17/336* (2015.01)
  *H04B 1/713* (2011.01)
  *H04L 27/26* (2006.01)
  *H04W 4/70* (2018.01)

(52) U.S. Cl.
  CPC .......... *H04L 1/0026* (2013.01); *H04L 1/0028* (2013.01); *H04L 5/005* (2013.01); *H04L 5/0012* (2013.01); *H04L 5/0057* (2013.01); *H04L 5/0064* (2013.01); *H04L 5/0092* (2013.01); *H04L 5/0023* (2013.01); *H04L 27/2647* (2013.01); *H04W 4/70* (2018.02)

(56) References Cited

U.S. PATENT DOCUMENTS

| | | | | |
|---|---|---|---|---|
| 9,071,399 | B2* | 6/2015 | Drewes | H04L 5/0044 |
| 10,111,066 | B2* | 10/2018 | Lin | H04W 4/70 |
| 10,298,306 | B2* | 5/2019 | Shimezawa | H04W 24/10 |
| 10,469,294 | B2* | 11/2019 | Kim | H04L 27/2613 |
| 2009/0270108 | A1 | 10/2009 | Xu | |
| 2011/0211482 | A1 | 9/2011 | Hoshino et al. | |

OTHER PUBLICATIONS

"Further details on CQI/MCS/TBS table design for MTC", 3GPP TSG RAN WG1 Meeting #82, R1-154236, LG Electronics, Beijing, China, Aug. 24-28, 2015, total of 6 pages.

"Introduction of Wideband-Only Aperiodic CSI Reporting Mode", 3GPP TSG RAN WG1 #82bis, R1-156236, Panasonic et al., Malmö, Sweden Oct. 5-9, 2015, total of 8 pages.

Ericsson et al., "WF on physical channel time and frequency relationships for MTC," 3GPP TSG RAN WG1 Meeting #82bis, R1-156326, Malmö, Sweden, Oct. 5-9, 2015, XP051045153, 16 pages.

LG Electronics, "Considerations on CSI for low complexity UEs," 3GPP TSG RAN WG1 Meeting #81, R1-152706, Fukuoka, Japan, May 25-29, 2015, XP050973973, pp. 1-6.

LG Electronics, "CSI feedback for low complexity UEs," 3GPP TSG RAN WG1 Meeting #82bis, R1-155372, Malmo, Sweden, Oct. 5-9, 2015, XP051039657, pp. 1-4.

Panasonic, "CSI repot/measurement in MTC," 3GPP TSG RAN WG1 Meeting #82bis, R1-155345, Malmö, Sweden, Oct. 5-9, 2015, XP051039642, pp. 1-3.

Sony, "CSI Measurement for LC-MTC," 3GPP TSG-RAN WG1 Meeting #82bis, R1-155613, Malmö, Sweden, Oct. 5-9, 2015, XP051002477, pp. 1-5.

* cited by examiner

METHOD AND APPARATUS FOR DEFINING WIDEBAND CQI IN WIRELESS COMMUNICATION SYSTEM

CROSS REFERENCE TO RELATED APPLICATIONS

This application is the National Phase of PCT International Application No. PCT/KR2016/011967, filed on Oct. 24, 2016, which claims priority under 35 U.S.C. 119(e) to U.S. Provisional Application No. 62/245,286, filed on Oct. 23, 2015 and 62/252,389, filed on Nov. 6, 2015, all of which are hereby expressly incorporated by reference into the present application.

TECHNICAL FIELD

The present invention relates to wireless communications, and more particularly, to a method and apparatus for defining a wideband channel quality indicator (CQI) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

A channel quality indicator (CQI) is an indicator carrying information on how good/bad the communication channel quality is. CQI is the information that the UE sends to the network, and practically it implies current communication channel quality and with which transport block size the UE wants to get the data, which in turn can be directly converted into throughput.

To fully support MTC UEs, an efficient method for measuring CQI may be required.

DISCLOSURE OF INVENTION

Technical Problem

The present invention provides a method and apparatus for defining a wideband channel quality indicator (CQI) in a wireless communication system. The present invention further discusses a transmission structure to transmit broadcast and unicast data while frequency hopping and half-duplex frequency division duplex (FDD) (or time division duplex (TDD)) are configured.

Solution to Problem

In an aspect, a method for measuring a channel quality indicator (CQI) by a machine-type communication user equipment (MTC UE) in a wireless communication system is provided. The method includes receiving at least one of a cell-specific reference signal (CRS) or a channel state information reference signal (CSI-RS) from a network, measuring a wideband CQI over plurality of narrowbands based on the received CRS or CSI-RS by averaging narrowband CQIs of the plurality of narrowbands, and transmitting the measured wideband CQI to the network.

In another aspect, a machine-type communication user equipment (MTC UE) in a wireless communication system is provided. The MTC UE includes a memory, a transceiver, and a processor, coupled to the memory and the transceiver, that controls the transceiver to receive at least one of a cell-specific reference signal (CRS) or a channel state information reference signal (CSI-RS) from a network, measures a wideband channel quality indicator (CQI) over plurality of narrowbands based on the received CRS or CSI-RS by averaging narrowband CQIs of the plurality of narrowbands, and controls the transceiver to transmit the measured wideband CQI to the network.

Advantageous Effects of Invention

A wideband CQI can be defined for enhanced machine-type communication (eMTC).

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-

20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
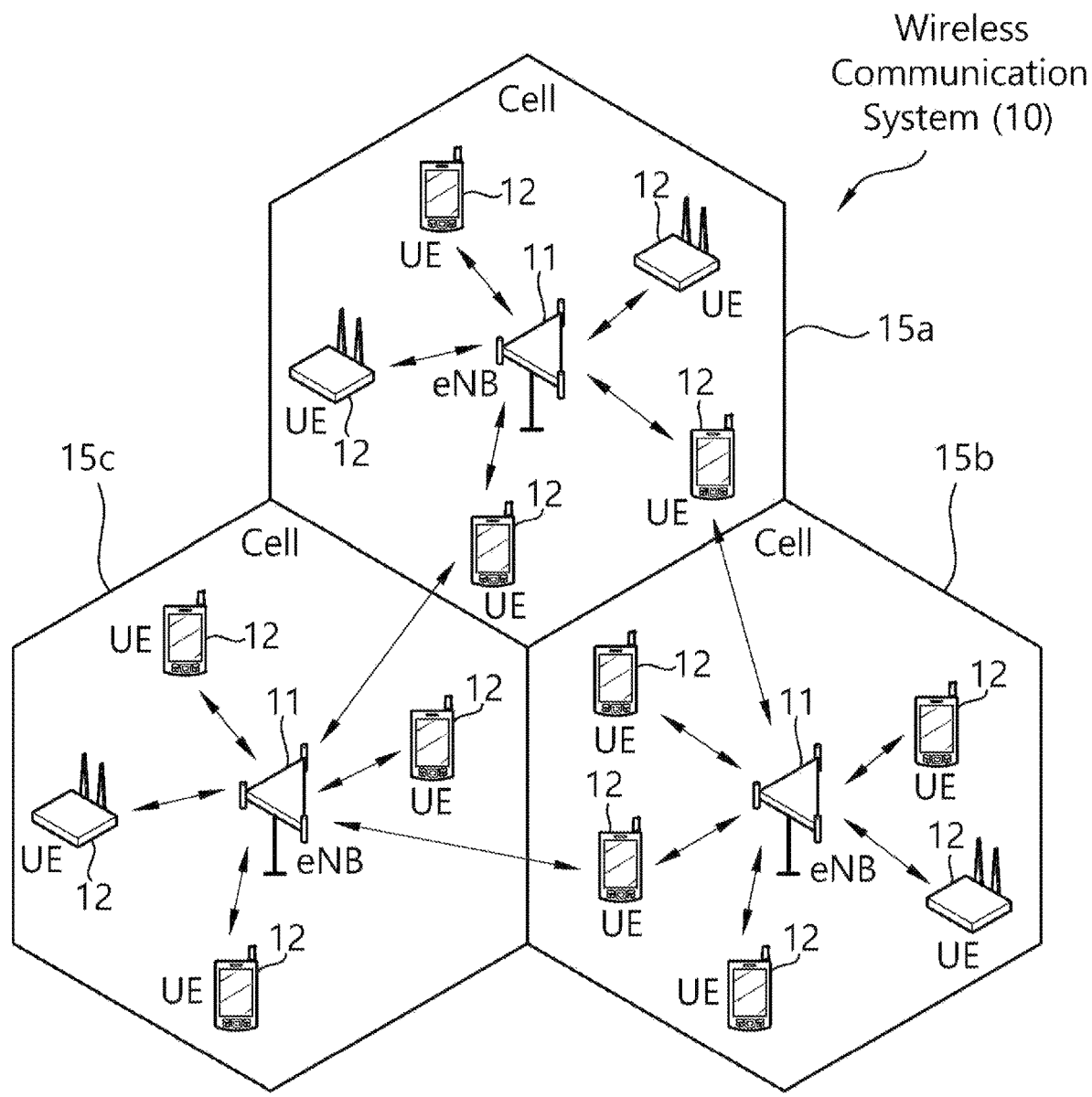
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
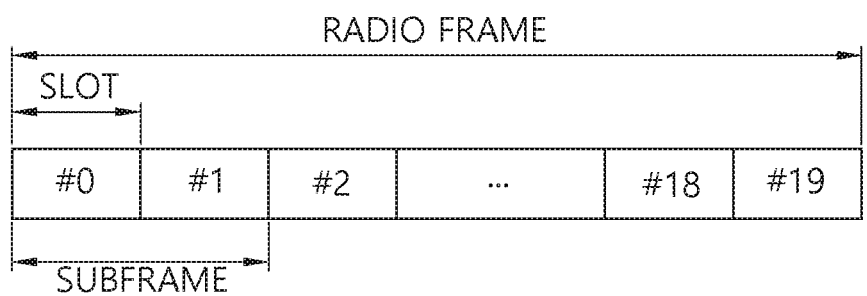
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
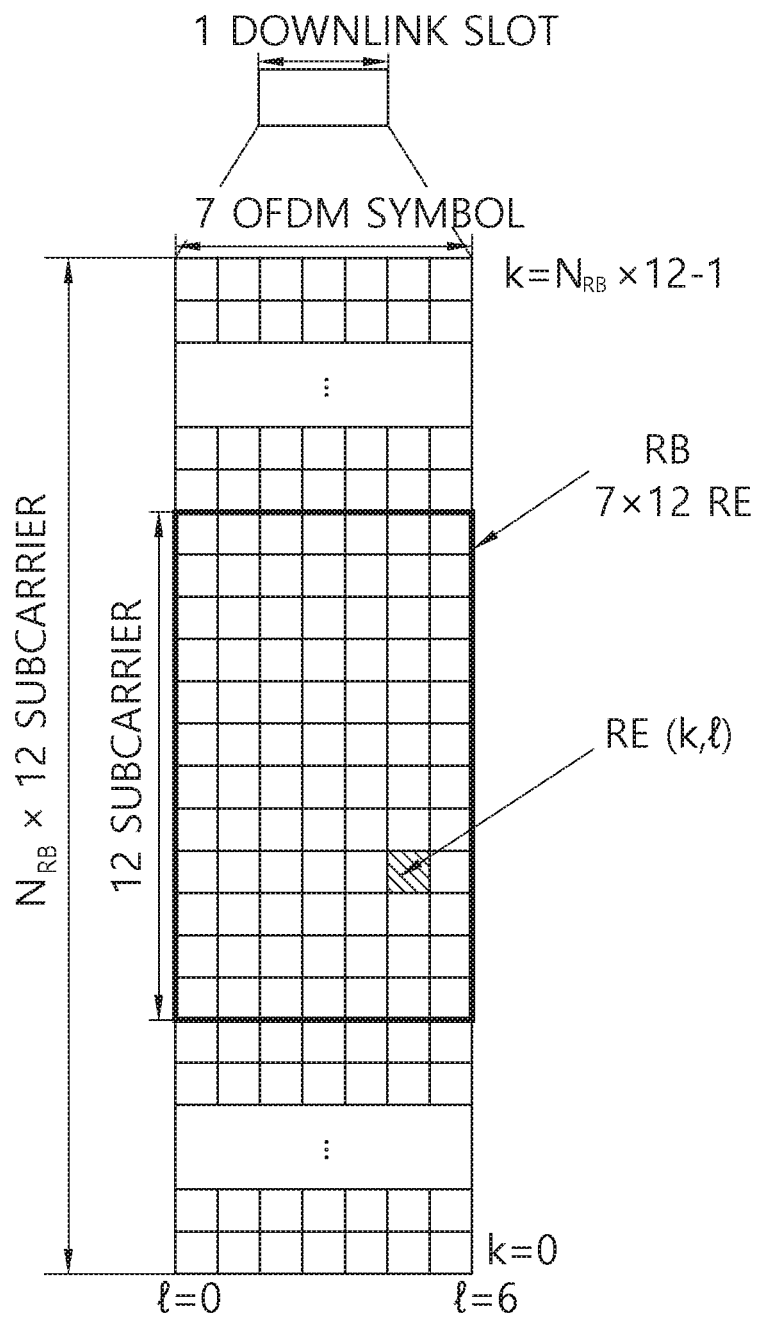
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
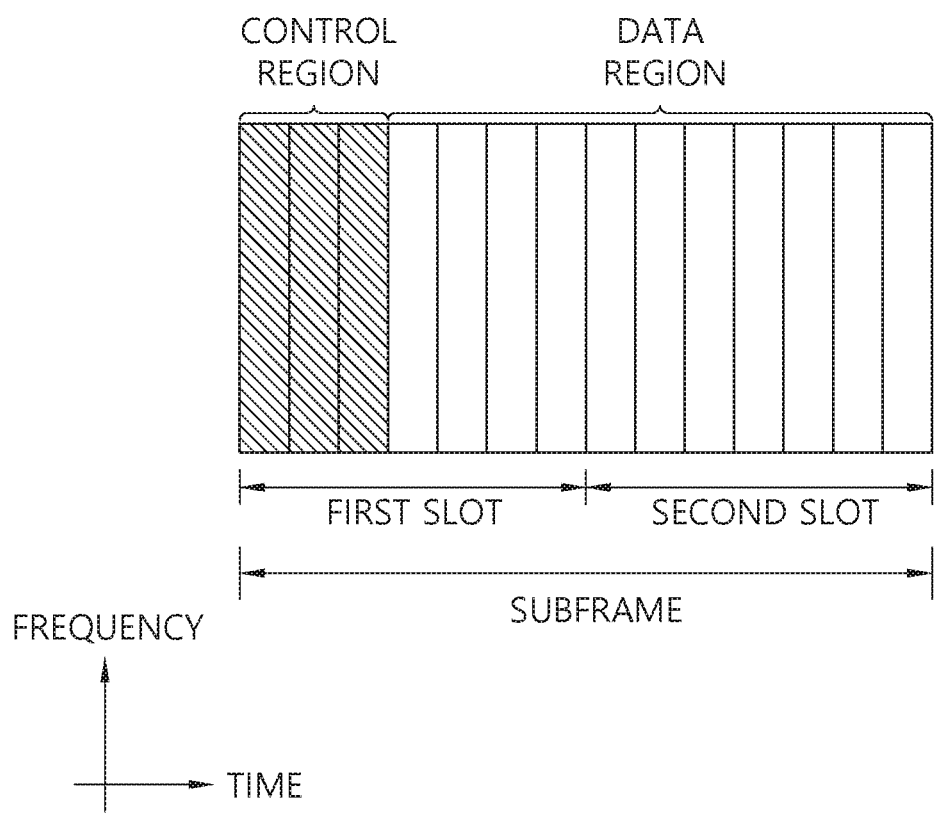
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
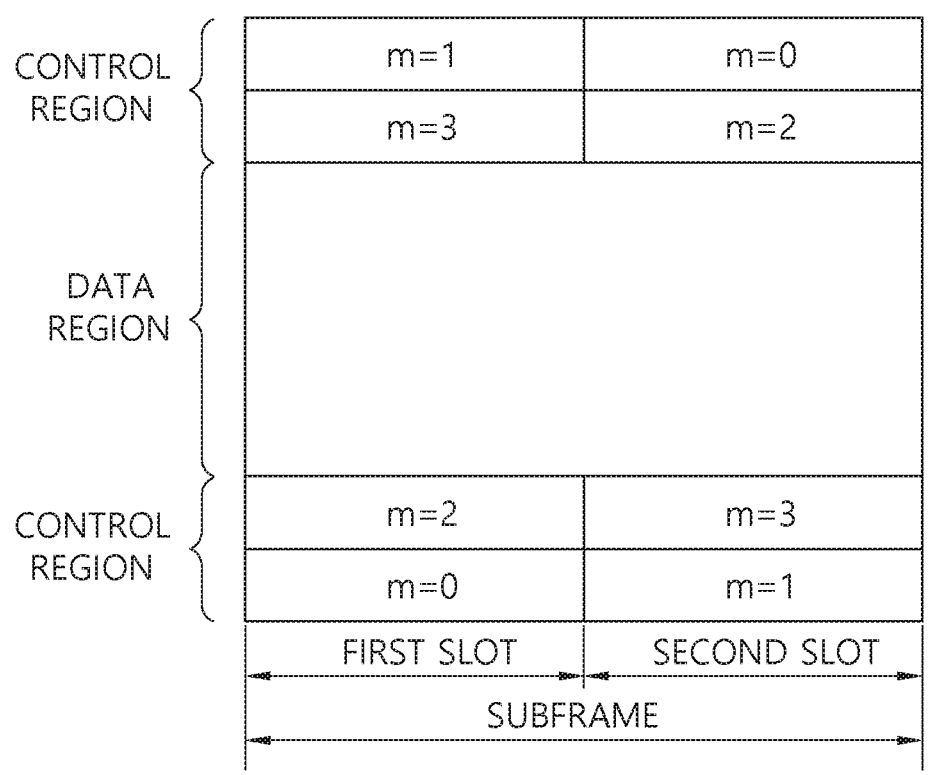
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In general, data may suffer from easily through wireless channel (so called frequency selective channel). So, reference signal (RS) that already known to both transmitter and receiver should be transmitted with data at the same time for channel estimation. There are two kinds of roles which RS should do: demodulation and channel measurement.

Since 3GPP LTE rel-8, a cell-specific reference signal (CRS) has been defined. The CRS is used for both measuring channel and demodulating data. The CRS is transmitted in all DL subframes in a cell supporting PDSCH transmission. The CRS is transmitted via up to 4 antenna ports according to a number of transmit antennas of the eNB. That is, the CRS is transmitted on one or several of antenna ports 0 to 3. For example, when the number of transmit antennas of the eNB is 2, the CRS is transmitted via antenna ports 0 and 1. When the number of transmit antennas of the eNB is 4, the CRS is transmitted via antenna ports 0, 1, 2 and 3.

Further, since 3GPP LTE rel-10, an additional channel state information RS (CSI-RS) has been defined. In terms of RS transmission, when the CRS, which is to be transmitted in all DL subframes within the whole system bandwidth, is defined for up to 8 antenna ports, RS overhead may significantly increase. Accordingly, in 3GPP LTE rel-10, the CSI-RS is defined for channel measurement, i.e. selection of modulation and coding scheme (MCS) and/or PMI, etc. Since the CSI-RS is transmitted only for obtaining channel state information, the CSI-RS may not need to be transmitted in all DL subframes. The CSI-RS is transmitted on one, two, four or eight antenna ports using p=15, p=15, 16, p=15, . . . , 18 and p=15, . . . 22, respectively. The CSI-RS is defined for $\Delta f=15$ kHz only.

Multiple CSI-RS configurations can be used in a given cell. A UE can be configured with multiple sets of CSI reference signals,
  up to three configurations for CSI reporting for which the UE shall assume non-zero transmission power for the CSI-RS, and
  zero or more configurations for which the UE shall assume zero transmission power, and
  zero or more configurations valid across the system downlink bandwidth as part of the discovery signals for which the UE shall assume non-zero transmission power for the CSI-RS.

The CSI-RS configurations for which the UE shall assume non-zero transmission power are provided by higher layers.

The CSI-RS configurations for which the UE shall assume zero transmission power in a subframe are given by a bitmap. For each bit set to one in the 16-bit bitmap, the UE shall assume zero transmission power for the resource elements corresponding to the four CSI-RS column in Tables 1 and 2 described below for normal and extended CP, respectively, except for resource elements that overlap with those for which the UE shall assume non-zero transmission power CSI-RS as configured by higher layers. The most significant bit corresponds to the lowest CSI-RS configuration index and subsequent bits in the bitmap correspond to configurations with indices in increasing order.

The CSI-RS can only occur in DL slots where ($n_s$ mod 2) fulfils the condition in Tables 1 and 2 for normal and extended CP, respectively.

The UE shall assume that CSI-RS is not transmitted
    in the downlink pilot time slot (DwPTS) in case of frame structure type 2,
    in subframes where transmission of a CSI-RS would collide with SystemInformationBlockType1 messages, in the primary cell in subframes configured for transmission of paging messages in the primary cell for any UE with the cell-specific paging configuration.

The UE shall assume that none of the CSI-RS corresponding to a CSI-RS configuration is transmitted in subframes where transmission of any of those CSI-RS would collide with transmission of synchronization signals or physical broadcast channel (PBCH).

Resource elements (k,l) used for transmission of CSI-RS on any of the antenna ports in the set S, where S={15}, S={15,16}, S={17,18}, S={19,20} or S={21,22} shall not be used for transmission of PDSCH on any antenna port in the same slot.

Table 1 shows mapping of CSI-RS configuration for normal CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 2 shows mapping of CSI-RS configuration for extended CP.

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

CQI is described. The time and frequency resources used by the UE to report CQI are under the control of the eNB. CQI reporting can be either periodic or aperiodic. A UE can be configured to have both periodic and aperiodic reporting at the same time. In case both periodic and aperiodic reporting occurs in the same subframe for a particular cell group (CG), only the aperiodic report is transmitted in that subframe.

For efficient support of localized, distributed and MIMO transmissions, E-UTRA supports three types of CQI reporting:

Wideband type: providing channel quality information of entire system bandwidth of the cell;

Multi-band type: providing channel quality information of some subset(s) of system bandwidth of the cell;

MIMO type: open loop or closed loop operation (with or without PMI feedback).

Periodic CQI reporting is defined by the following characteristics:

When the UE is allocated PUSCH resources in a subframe where a periodic CQI report is configured to be sent, the periodic CQI report is transmitted together with UL data on the PUSCH. Otherwise, the periodic CQI reports are sent on the PUCCH.

Aperiodic CQI reporting is defined by the following characteristics:

The report is scheduled by the eNB via the PDCCH;

Transmitted together with UL data on PUSCH.

When a CQI report is transmitted together with UL data on PUSCH, it is multiplexed with the transport block by L1 (i.e. the CQI report is not part of the UL transport block).

The eNB configures a set of sizes and formats of the reports. Size and format of the report depends on whether it is transmitted over PUCCH or PUSCH and whether it is a periodic or aperiodic CQI report.

The CQI indices and their interpretations are given in Table 3 for reporting CQI based on quadrature phase shift keying (QPSK), 16 quadrature amplitude modulation (QAM) and 64QAM. The CQI indices and their interpretations are given in Table 4 for reporting CQI based on QPSK, 16QAM, 64QAM and 256QAM.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 4

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

Based on an unrestricted observation interval in time and frequency, the UE shall derive for each CQI value reported in UL subframe n the highest CQI index between 1 and 15 in Table 3 or Table 4 which satisfies the following condition, or CQI index 0 if CQI index 1 does not satisfy the condition:

A single PDSCH transport block with a combination of modulation scheme and transport block size corresponding to the CQI index, and occupying a group of DL physical resource blocks termed the CSI reference resource, could be received with a transport block error probability not exceeding 0.1.

If CSI subframe sets $C_{CSI,0}$ and $C_{CSI,1}$ are configured by higher layers, each CSI reference resource belongs to either $C_{CSI,0}$ or $C_{CSI,1}$ but not to both. When CSI subframe sets $C_{CSI,0}$ and $C_{CSI,1}$ are configured by higher layers a UE is not expected to receive a trigger for which the CSI reference resource is in subframe that does not belong to either subframe set. For a UE in transmission mode 10 and periodic CSI reporting, the CSI subframe set for the CSI reference resource is configured by higher layers for each CSI process.

For a UE in transmission mode 9 when parameter pmi-RI-Report is configured by higher layers, the UE shall derive the channel measurements for computing the CQI value reported in UL subframe n based on only the CSI-RS for which the UE is configured to assume non-zero power for the CSI-RS. For a UE in transmission mode 9 when the parameter pmi-RI-Report is not configured by higher layers or in transmission modes 1-8 the UE shall derive the channel measurements for computing CQI based on CRS.

For a UE in transmission mode 10, the UE shall derive the channel measurements for computing the CQI value reported in UL subframe n and corresponding to a CSI process, based on only the non-zero power CSI-RS within a configured CSI-RS resource associated with the CSI process.

For a UE in transmission mode 10, the UE shall derive the interference measurements for computing the CQI value reported in UL subframe n and corresponding to a CSI process, based on only the configured CSI interference measurement (CSI-IM) resource associated with the CSI process. If the UE in transmission mode 10 is configured by higher layers for CSI subframe sets $C_{CSI,0}$ and $C_{CSI,1}$ for the CSI process, the configured CSI-IM resource within the subframe subset belonging to the CSI reference resource is used to derive the interference measurement. For a UE configured with the parameter EIMTA-MainConfigServCell-r12 for a serving cell, configured CSI-IM resource(s) within only DL subframe(s) of a radio frame that are indicated by UL/DL configuration of the serving cell can be used to derive the interference measurement for the serving cell.

A combination of modulation scheme and transport block size corresponds to a CQI index if:
the combination could be signaled for transmission on the PDSCH in the CSI reference resource according to the relevant transport block size table, and
the modulation scheme is indicated by the CQI index, and
the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

In the current LTE specification, all UEs shall support maximum 20 MHz system bandwidth, which requires baseband processing capability to support 20 MHz bandwidth. To reduce hardware cost and battery power of MTC UEs, reducing bandwidth is a very attractive option. To enable narrowband MTC UEs, the current LTE specification shall be changed to allow narrowband UE category. If the serving cell has small system bandwidth (smaller than or equal to bandwidth that narrow-band UE can support), the UE can attach based on the current LTE specification.

For example, a MTC UE may operate in reduced UE downlink and/or uplink bandwidth of 1.4 MHz (i.e. 6 PRBs), regardless of operating system bandwidth of a cell. A subband in which a MTC UE operates (i.e. MTC subband) may be located in a center of the system bandwidth (e.g. center 6 PRBs). Alternatively, multiple subbands in which multiples MTC UEs operates may be allocated in one subframe for multiplexing of the multiple MTC UEs. In this case, the multiple UEs may use different subbands from each other, or, may use the same subband (not center 6 PRBs).

Further, a MTC UE may operate in further reduced UE downlink and/or uplink bandwidth of 200 kHz (i.e. 1 PRB). The MTC UE may operate in a legacy cell which has a system bandwidth wider than 200 kHz with backward compatibility. This system may be referred to as in-band narrow-band (NB) LTE. Alternatively, the MTC UE may operate in a frequency, in which the legacy cell does not exist and only for the MTC UE. This system may be referred to as stand-alone LTE.

When the MTC UE operates in the reduced bandwidth, the MTC UE may not receive legacy PDCCH transmitted via whole system bandwidth. Further, it may not be desirable that a PDCCH for the MTC UE is received in OFDM symbols in which the legacy PDCCH is received due to multiplexing issues with PDCCH transmitted to another UE. Accordingly, a new physical DL control channel transmitted in a subband in which the MTC UE operates may be introduced for the MTC UE. The new physical DL control channel for the MTC UE (or, low-complexity UE) may be an existing enhanced PDCCH (EPDCCH) or may be a modified version of PDCCH/EPDCCH. Hereinafter, the new physical DL control channel may be referred to as an M-PDCCH (MTC-PDCCH).

Low complexity UEs are targeted to low-end (e.g. low average revenue per user, low data rate, delay tolerant) applications, e.g. some MTC. A low complexity UE has reduced Tx and Rx capabilities compared to other UE of different categories. Among low complexity UEs, a bandwidth reduced low complexity (BL) UE may operate in any LTE system bandwidth but with a limited channel bandwidth of 6 PRBs (corresponding to the maximum channel bandwidth available in a 1.4 MHz LTE system) in DL and UL. A BL UE may a transport block size (TBS) limited to 1000 bit for broadcast and unicast.

Hereinafter, a MTC UE, a UE requiring coverage enhancement (CE), a low cost UE, a low end UE, a low complexity UE, a narrow(er) band UE, a small(er) band UE, a new category UE, a BL UE, or narrowband internet-of-things (NB-IoT) UE, or NB-LTE UE may have the same meaning, and may be used mixed. Or, just a UE may refer one of UEs described above. Further, in the description below, a case where system bandwidth of available cells is larger than bandwidth that new category narrowband UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. In these cases, the UE may be able to receive only a limited number of PRBs or subcarriers. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

Hereinafter, various enhancements for supporting MTC UEs are described according to embodiments of the present invention.

1. Wideband CQI Definition for MTC UEs

As described above, one of CQI reporting type is wideband type which provides channel quality information of entire system bandwidth of the cell. However, definition of wideband may be reconsidered for MTC UEs, in contrast to current wideband that represents the system bandwidth. Since MTE UEs cannot use system bandwidth as a whole, conventional wideband may not properly work. Considering this problem, the following two options may be considered.

(1) Any wideband CSI feedback may not be reported and a UE may report only one or a few subband CSI feedbacks.

(2) Alternatively, the definition of wideband CSI feedback may be redefined. The Wideband CQI may be measured over narrowbands (or, subbands) which are monitored by a UE such as from frequency hopping of M-PDCCH repetitions. For example, if four narrowbands are used for M-PDCCH for a given UE with frequency hopping, to determine proper modulation and TBS for the UE, either four narrowbands CQIs may be needed or one wideband CQI averaged over four narrowbands measured in different time may be considered. Therefore, to minimize the overhead of measurement and reporting, the definition of wideband CQI may be revised to indicate the averaged CQI over multiple narrowbands configured for frequency hopping of M-PDCCH or multiple narrowbands monitored by UE during the measurement. The UE may average signal to interference and noise ratio (SINR) measurement from any narrowbands configured for wideband CQI measurement. Further, if different narrowband set is used for PDSCH transmission from M-PDCCH, whether to allow using such narrowbands used for PDSCH transmission or not needs to be clarified. Given that M-PDCCH monitoring is periodic operation and a UE will continuously perform, only narrowbands used for M-PDCCH monitoring may be used for wideband CQI measurements.

In summary, wideband CQI may be supported, and may be measured over narrowbands which a UE monitors. In other words, reference resource of wideband CQI may consist of multiple narrowbands in different time, which may be averaged for wideband CQI computation. One example of set of narrowbands is the set of narrowbands used for M-PDCCH transmission.

2. Channel Estimation and Reporting for MTC UEs

Cross-narrowband scheduling based on narrowband CQI feedback may also be considered for MTC UEs. CQI feedbacks can be restricted to a subset of narrowbands. For efficient narrowband selection based on CQI feedback, narrowband CQI feedback(s) may be reported on one or a few narrowbands. In summary, a narrowband CQI may be defined that a UE measures SINR only for the given narrowband and may perform average over measurements only from the same narrowband. For narrowband CQI reporting, a subset of narrowbands for CQI reporting may be implicitly indicated by the network. The set of narrowbands may be a set of narrowbands used for M-PDCCH transmission for the given UE. On the other hand, the wideband CQI may be defined that a UE measure/average over any narrowband which a UE may monitor at a given moment.

Based on the definition of narrowband CQI and wideband CQI for MTC UEs described above, CQI reporting for MTC UEs may follow Table 5.

TABLE 5

| | no cross-narrowband scheduling | cross-narrowband scheduling |
|---|---|---|
| no frequency hopping | "1" narrowband or "M" narrowbands | "M" narrowbands |
| frequency hopping | wideband + "1" narrowband or "M" narrowbands | wideband + "M" narrowbands |

To find an appropriate narrowband for PDSCH for MTC UE, several narrowbands candidates for PDSCH need to be measured. If a UE needs to monitor different narrowbands which may be potentially different from the narrowband in which M-PDCCH can be scheduled, frequency retuning and a CQI measurement gap may be necessary. Reference resource subframe may be multiple for CQI measurement, thus, depending on the number of narrowbands and size of 'm' for reference resource, the measurement gap length may be rather large. This may lead considerable overhead. Thus, any measurement gap for CQI measurement may not need to be specified due to overhead. Instead, the UE may monitor narrowbands used for M-PDCCH frequency hopping for narrowband CQI and wideband CQI measurements.

Further, it may be discussed how to handle if frequency hopping is not used, while achieving frequency selective scheduling. If frequency hopping is not used, a UE may be configured with a set of narrowbands to monitor. However, this needs to be configured also with a measurement gap. In this case, a measurement gap for CQI measurement may be the same as the measurement gap configured for intra-frequency measurement. That is, if frequency hopping is not used, 'm' narrowbands may be configured for CQI measurements, and measurement gap for intra-frequency measurement may also be used for this purpose.

For narrowband CQI reporting, narrowband only reporting mode may be introduced, and due to the limited size of feedback container, one narrowband CQI may be reported on one PUCCH at a time. This round-robin narrowband CQI reporting is similar to feedback mode 2-0 or 2-1, except that there is no wideband CQI reporting and best-1 indicator feedback. Reporting CQIs of multiple narrowbands on one PUCCH resource may also be considered.

3. Reference Resource and RS for MTC UEs

For an UE in small DL coverage enhancement. CSI reference resource may be extended to span multiple subframes M (M>1). M value may be UE specific depending on the coverage enhancement (CE) level since each UE will experience different channel condition and required CE level will also be different for each UE. That is, different CE level may result in the different M values. In addition, the required CE level may be changed depending on the channel condition. Hence, M value may be configured semi-statically. M value may be implicitly determined by CE level configured to the UE on PDSCH or M-PDCCH. For example, the minimum repetition number may be selected as M value from the set of PDSCH repetition levels corresponding to the CE level configured to the UE.

Further, generally, due to the lower bandwidth and lower SINR, feedback based on CSI-RS may be challenging. Also, it may be challenging to repeat CSI-RS, since CSI-RS is a cell-specific RS without impact legacy UEs. In that sense, in rel-13 eMTC, only CQI feedback based on CRS may be supported.

4. CQI Table Design for MTC UEs

Assuming that CE level changes into a lower one, the UE may report CQI index corresponding to out-of-range, which may result in no DL PDSCH transmission because of no matched CQI value with current channel condition. In this case, several CQI indices representing lower spectral efficiency values may be defined, which may result in avoiding the above situation. The number of newly introduced CQI indices may be enough to the SNR gap between consecutive CE levels, assuming that most of CE level change will happen between consecutive CE levels. For example, if the SNR gap between consecutive CE levels is 5 dB, 2 or 3 CQI indices representing lower spectral efficiency values may be required considering that the SINR spacing between CQI indices is about 1.89 dB.

Table 6 shows an example of CQI table to support lower spectral efficiency according to an embodiment of the present invention. Table 6 may be modified version of Table 3 described above. Referring to Table 6, CQI indices representing 64QAM may be replaced with CQI indices for lower operating SINR range, i.e. CQI indices 1, 2, and 3. Considering this aspect, CQI table to support MTC UE may be designed without additional signalling overhead.

TABLE 6

| CQI index | modulation | code rate × 1024 | efficiency |
|---|---|---|---|
| 0 | | out of range | |
| 1 | QPSK | 17 | 0.0349 |
| 2 | QPSK | 31 | 0.0614 |
| 3 | QPSK | 53 | 0.1036 |
| 4 | QPSK | 78 | 0.1523 |
| 5 | QPSK | 120 | 0.2344 |
| 6 | QPSK | 193 | 0.3770 |
| 7 | QPSK | 308 | 0.6016 |
| 8 | QPSK | 449 | 0.8770 |
| 9 | QPSK | 602 | 1.1758 |
| 10 | 16QAM | 378 | 1.4766 |
| 11 | 16QAM | 490 | 1.9141 |
| 12 | 16QAM | 616 | 2.4063 |
| 13 | | N/A | |
| 14 | | | |
| 15 | | | |

Figure 6:
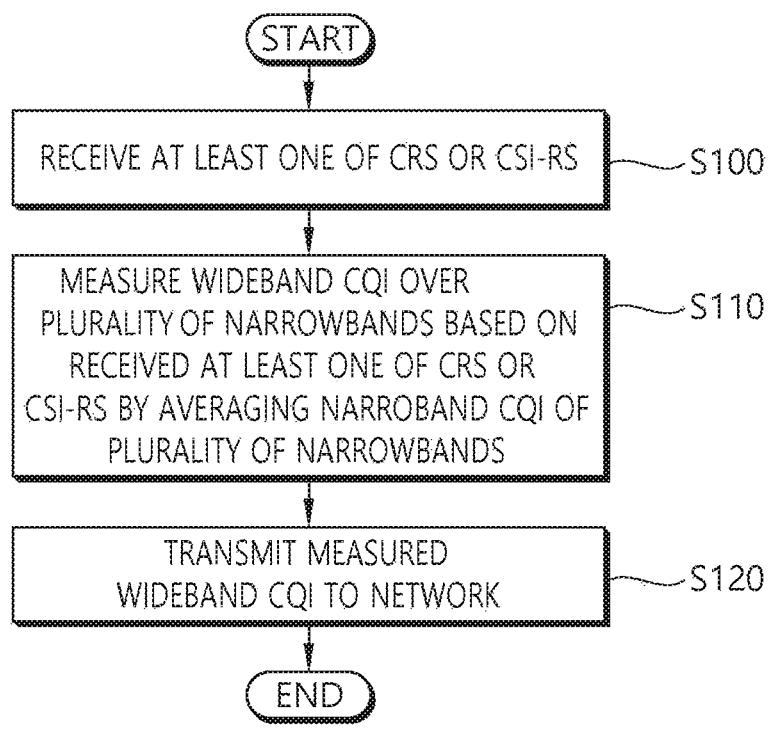
FIG. 6 shows a method for measuring a CQI by a MTC UE according to an embodiment of the present invention.

FIG. 6 shows a method for measuring a CQI by a MTC UE according to an embodiment of the present invention.

In step S100, the MTC UE receives at least one of CRS or CSI-RS from a network. The CSI-RS may correspond to one UE-specific zero-power CSI-RS configuration only for repetition levels corresponding to CE mode A.

In step S110, the MTC UE measures a wideband CQI over plurality of narrowbands based on the received CRS or CSI-RS by averaging narrowband CQIs of the plurality of narrowbands. The plurality of narrowband may correspond to narrowbands monitored by the MTC UE. The plurality of narrowband may correspond to narrowband used for M-PDCCH. The M-PDCCH may be subject to frequency hopping. Averaging narrowband CQIs of the plurality of narrowbands may comprise averaging SINR from narrowbands configured for wideband CQI measurement.

In step S120, the MTC UE transmits the measured wideband CQI to the network. Further, the MTC UE may further measure a narrowband CQI over a subset of the plurality of narrowbands. The subset of the plurality of narrowbands may be indicated by the network.

5. PBCH Mapping for MTC UEs

If a system bandwidth is larger than 1.4 MHz, more than one narrowband may be configured. It may be assumed that M number of narrowbands are configured for a system bandwidth. Since a UE cannot receive at least one of broadcast data or unicast data simultaneously, and a UE may also require one slot or one subframe to perform frequency retuning if narrowband changes, careful considerations on multiplexing may be performed.

Among M number of narrowbands, there may be one narrowband carrying PBCH, and another narrowband carrying MTC-SIB1, and another narrowband carrying MTC-SIB2, and so on. Each narrowband may be the same or each narrowband may be configured by previous channel (for example, PBCH may configured narrowband for MTC-SIB1, MTC-SIB1 may configure narrowband for MTC-SIB2, and so on). Regardless of narrowband, a cell-specific narrowband hopping pattern may be configured. For example, for a narrowband i, it may jump to the location of subband j, where j=fk (SFN, cell ID) and k is the index of hopping pattern. This example shows that frequency hopping occurs in every radio frame. However, frequency hopping may occur in multiple subframes rather than a radio frame unit.

For primary synchronization signal (PSS)/secondary synchronization signal (SSS)/PBCH reading, the UE may stay in the center 6 PRBs. For PSS/SSS/PBCH, frequency hopping may be disabled. In other words, the center 6 PRBs may always be used to transmit PSS/SSS/PBCH.

For paging reading, if a UE is in RRC_CONNECTED, a UE may assume that paging occurs in a narrowband in which the UE is configured to monitor unicast data and/or control signal. If the UE is in RRC_IDLE, a UE may monitor the paging narrowband configured/indicated by the network based on UE-ID or some other means. While a UE is reading paging, it may not be required to receive any other data/channel until receiving paging message is completed.

For MTC-SIB1 reading, a UE may not be required to receive any other data/channel until the MTC-SIB1 reading is completed. If the MTC-SIB1 is read based on UE autonomous behavior (e.g. update SIB due to timer expiration, etc.), the UE may also read other unicast data. If there is on-going unicast transmission, the UE may not be required to receive SIB(s) simultaneously. For other SIB(s), if a UE reads SIB(s) because of SIB(s) update, a UE may not be required to receive any unicast data until updating on SIB(s) is completed.

To maximize frequency tracking possibilities which requires the same data mapping, different PBCH mapping may be proposed according to an embodiment of the present invention. In this case, change of redundancy version (RV) may also enhance the overall performance.

One possible PBCH mapping in FDD is to take different approach in subframe #0 and #9. In subframe #0 of FDD frame, since legacy mapping cannot be changed, PBCH may be mapped with different RV and all the remaining REs may be mapped with data with different RV from the beginning. In subframe #9 of FDD frame, since new mapping is possible, PBCH may be mapped to maximize frequency tracking. For example, the same data may be placed to the next OFDM symbol. That is, two OFDM symbols close each other may use the same mapping.

Figure 7:
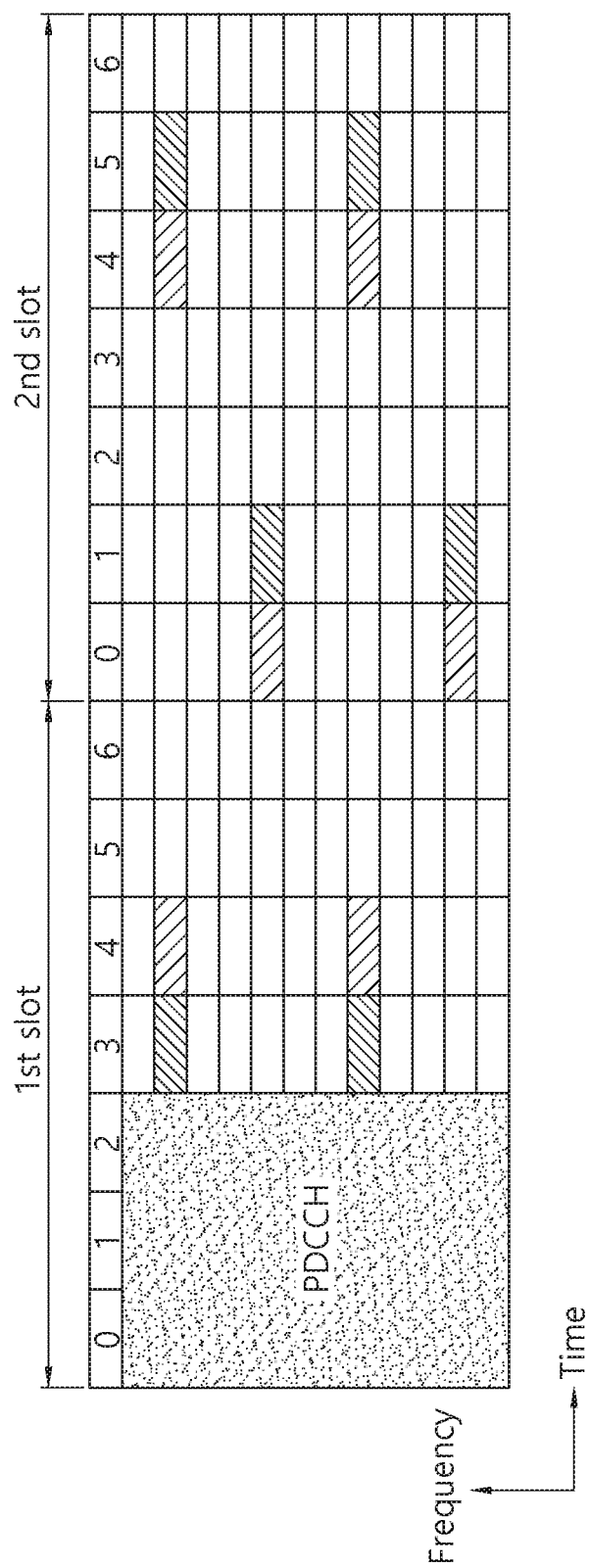
FIG. 7 shows an example of PBCH mapping according to an embodiment of the present invention.

FIG. 7 shows an example of PBCH mapping according to an embodiment of the present invention. Referring to FIG. 7, two OFDM symbols close each other, i.e. symbols #3/#4 in the first slot, symbols #0/#1 in the second slot, and symbols #4/5 in the second slot, use the same mapping. In FIG. 7, the same pattern grouped in terms of symbols may be mapped with the same data. To make the same mapping, virtual CRS may be used for subframe #9 as well. Those virtual CRS actually may be used for additional CRS for low complexity UE PBCH decoding. In other words, the UE may expect that the network will transmit CRS in such additional REs as well. The same mapping corresponding the pair may be used in the virtual CRS.

In summary, PBCH mapping in subframe #9 may be different from PBCH mapping in subframe #0 in terms of RV or data. Further, since there is no legacy PBCH, the same data may be mapped in OFDM symbols adjacent each other. For the data mapping, in adjacent OFDM symbols, some REs may not contain any data to map the same data. For example, in FIG. 7, symbol #3 in the first slot may have any mapping. CRS may be mapped same as the next OFDM symbol for further enhancement of CRS based channel estimation.

In TDD frame, a similar approach may be applicable to subframe #5. That is PBCH mapping in subframe #5 may be different from PBCH mapping in subframe #0 in terms of data and/or mapping mechanism.

If this is used, all REs may be used in subframe #0, and frequency tracking may be enjoyed in subframe #9 for FDD, (and subframe #0 and #5 for TDD). The same data mapped to full OFDM symbols without any RS (such as symbol #3 in second slot) may be mapped to the last OFDM symbol in subframe #9 for FDD.

Figure 8:
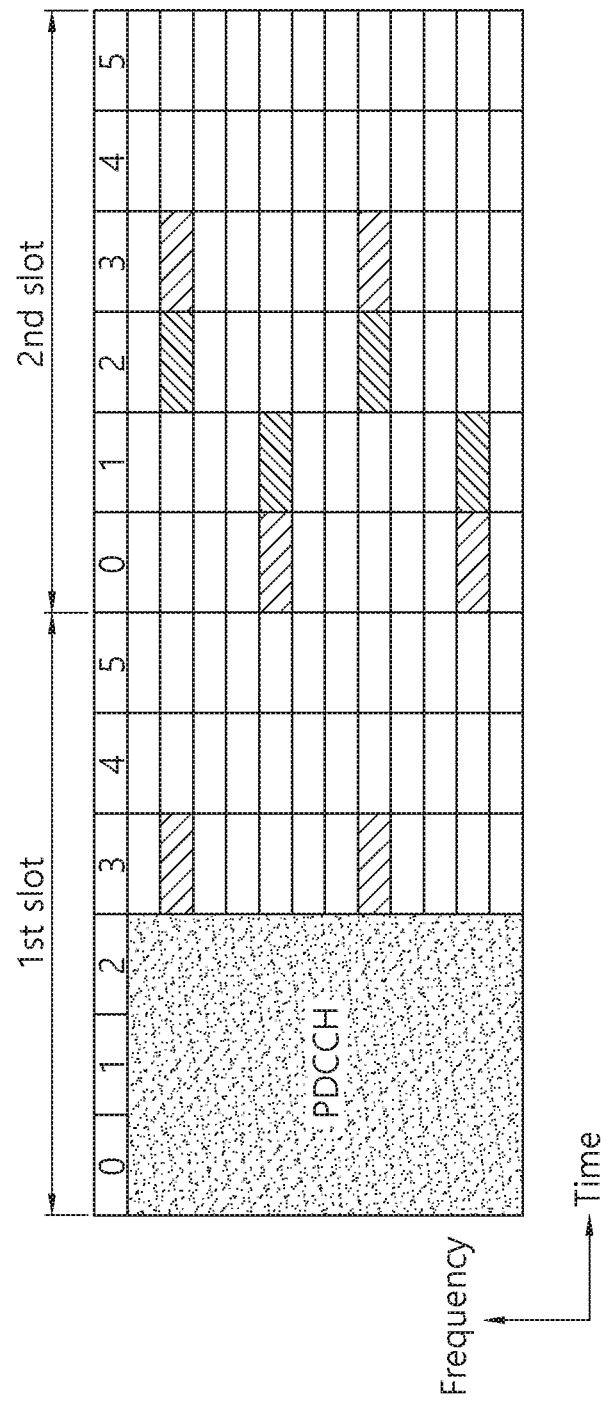
FIG. 8 shows another example of PBCH mapping according to an embodiment of the present invention.

FIG. 8 shows another example of PBCH mapping according to an embodiment of the present invention. FIG. 8 corresponds to PBCH mapping in extended CP. Referring to FIG. 8, two OFDM symbols close each other, i.e. symbols #0/#1 in the second slot, and symbols #2/3 in the second slot, use the same mapping. In FIG. 8, the same pattern grouped in terms of symbols may be mapped with the same data.

In terms of principle for PBCH mapping, at least one of the followings may be considered.

In 10 ms, different coded bits may be mapped as much as possible.

At least in one subframe, frequency tracking aided mapping (the same data mapped in a predetermined manner) may be used such that a UE can perform frequency tracking on those data.

Different scrambling may be used in different subframes (and/or OFDM symbols where the same data is mapped)

For frequency tracking purpose, the same data may be placed as close as each other, e.g. by mapping across adjacent OFDM symbols.

6. CSI-RS Mapping for MTC UEs

For legacy CSI-RS, SIB may be always punctured. From a UE perspective, a UE may assume that CSI-RS will not be transmitted. From a cell perspective, CSI-RS will puncture MTC SIB transmission. Likewise, random access response (RAR)/aging PDSCH may be always punctured, as same as SIB handling. M-PDCCH in cell-specific search space (CCS) may be always be punctured, as same as SIB handing. Alternatively, M-PDCCH in CSS may be rate-matched based on zero-power CSI-RS configuration. In this case, one zero-power CSI-RS (cell-specific) configuration may be used for all repetition levels. Or, one zero-power CSI-RS (cell-specific) configuration may be applied only for repetition levels corresponding to CE mode A. For repetition levels corresponding to CE mode B, CSI-RS is not assumed. Or, one zero-power CSI-RS (cell-specific) configuration per coverage level may be used. It may also be configured only for repetition levels corresponding to CE mode A.

M-PDCCH/PDSCH in UE-specific search space (UCS) may be always be punctured, as same as SIB handing. Alternatively, M-PDCCH/PDSCH in USS may be rate-matched based on zero-power CSI-RS configuration, same as M-PDCCH in CSS. M-PDCCH/PDSCH in USS and M-PDCCH in CSS may share the same zero-power CSI-RS configuration. Alternatively, M-PDCCH/PDSCH in USS may be rate-matched based on UE-specific zero-power CSI-RS configuration. In this case, one zero-power CSI-RS (UE-specific) configuration may be used for all repetition levels. Or, one zero-power CSI-RS (UE-specific) configuration may be applied only for repetition levels corresponding to CE mode A. For repetition levels corresponding to CE mode B, CSI-RS is not assumed. Or, one zero-power CSI-RS (UE-specific) configuration per coverage level may be used. It may also be configured only for repetition levels corresponding to CE mode A.

Further, non-zero-power CSI-RS configuration may be given to CE mode A UEs, which are also rate matched in M-PDCCH/PDSCH.

Figure 9:
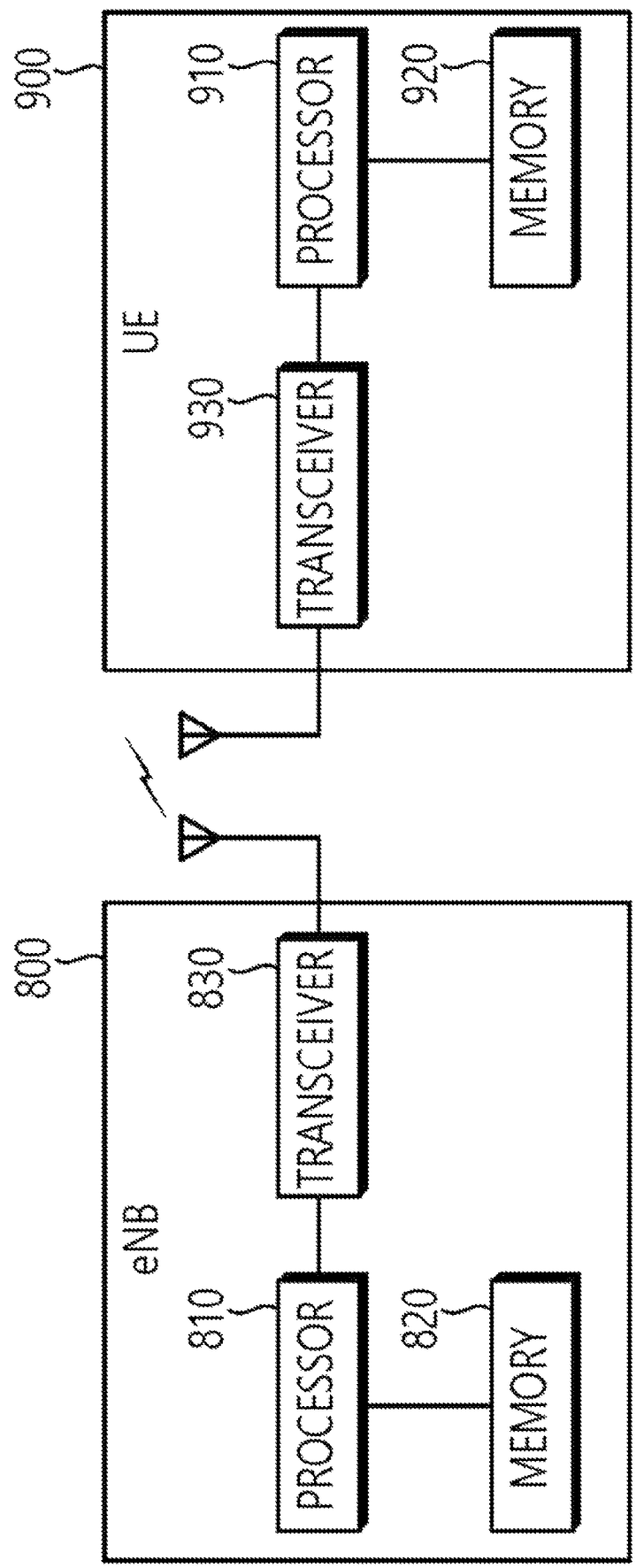
FIG. 9 shows a wireless communication system to implement an embodiment of the present invention.

FIG. 9 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for measuring a channel quality indicator (CQI) by a machine-type communication user equipment (MTC UE) in a wireless communication system, the method comprising:
   receiving at least one of a cell-specific reference signal (CRS) or a channel state information reference signal (CSI-RS) from a network;
   measuring narrowband CQIs for a plurality of narrowbands, which are received in a plurality of subframes, based on the received CRS or CSI-RS,
   wherein each narrowband of the plurality of narrowbands is monitored, by the MTC UE, in a different subframe,
   wherein the plurality of narrowbands are used for a MTC physical downlink control channel (M-PDCCH), and
   wherein frequency hopping is not used for the M-PDCCH;
   measuring a wideband CQI over the plurality of narrowbands by averaging the narrowband CQIs in the plurality of narrowbands,
   wherein each narrowband CQI of the narrowband CQIs is measured in the different subframe; and
   transmitting the measured wideband CQI to the network,
   wherein a number of the plurality of narrowbands is determined based on a Coverage Enhancement (CE) level configured for the MTC UE, based on that the frequency hopping is not used for the M-PDCCH, and
   wherein the CSI-RS includes one UE-specific zero-power CSI-RS configuration only for repetition levels related to coverage enhancement (CE) mode A.

2. The method of claim 1, wherein averaging narrowband CQIs in the plurality of narrowbands comprises averaging signal to interference and noise ratio (SINR) from narrowbands configured for wideband CQI measurement.

3. The method of claim 1, further comprising measuring a narrowband CQI over a subset of the plurality of narrowbands.

4. The method of claim 3, wherein the subset of the plurality of narrowbands is informed by the network.

5. A machine-type communication user equipment (MTC UE) in a wireless communication system, the MTC UE comprising:
   a memory;
   a transceiver; and
   a processor, operatively coupled to the memory and the transceiver, the processor is configured to:
   control the transceiver to receive at least one of a cell-specific reference signal (CRS) or a channel state information reference signal (CSI-RS) from a network;
   measure narrowband channel quality indicators (CQIs) for a plurality of narrowbands, which are received in a plurality of subframes, based on the received CRS or CSI-RS,
   wherein each narrowband of the plurality of narrowbands is monitored, by the processor, in a different subframe,
   wherein the plurality of narrowbands are used for a MTC physical downlink control channel (M-PDCCH), and
   wherein frequency hopping is not used for the M-PDCCH;
   measure a wideband CQI over the plurality of narrowbands by averaging the narrowband CQIs in the plurality of narrowbands,
   wherein each narrowband CQI of the narrowband CQIs is measured in the different subframe; and
   control the transceiver to transmit the measured wideband CQI to the network,
   wherein a number of the plurality of narrowbands is determined based on a Coverage Enhancement (CE) level configured for the MTC UE, based on that the frequency hopping is not used for the M-PDCCH, and
   wherein the CSI-RS includes one UE-specific zero-power CSI-RS configuration only for repetition levels related to coverage enhancement (CE) mode A.

6. The MTC UE of claim 5, wherein averaging narrowband CQIs in the plurality of narrowbands comprises averaging signal to interference and noise ratio (SINR) from narrowbands configured for wideband CQI measurement.

7. The MTC UE of claim 5, the processor is further configured to:
   measure a narrowband CQI over a subset of the plurality of narrowbands.

8. The MTC UE of claim 7, wherein the subset of the plurality of narrowbands is informed by the network.

* * * * *